(12) United States Patent
Levy (10) Patent No.: US 9,275,446 B2
(45) Date of Patent: Mar. 1, 2016

(54) LARGE RADIUS EDGE-PRESERVING LOW-PASS FILTERING

(71) Applicant: Samsung Electronics Co., Ltd., Suwon-Si, Gyeonggi-Do (KR)

(72) Inventor: Nathan Henri Levy, Givatyim (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 175 days.

(21) Appl. No.: 14/054,087

(22) Filed: Oct. 15, 2013

(65) Prior Publication Data

US 2015/0104112 A1    Apr. 16, 2015

(51) Int. Cl.
  *G06K 9/40* (2006.01)
  *G06T 5/10* (2006.01)
  *G06T 3/40* (2006.01)
  *G06T 5/00* (2006.01)

(52) U.S. Cl.
  CPC ............... *G06T 5/10* (2013.01); *G06T 3/4015* (2013.01); *G06T 5/008* (2013.01); *G06T 2207/20028* (2013.01); *G06T 2207/20192* (2013.01); *G06T 2207/20208* (2013.01)

(58) Field of Classification Search
  None
  See application file for complete search history.

(56) References Cited

U.S. PATENT DOCUMENTS

| | | | | |
|---|---|---|---|---|
| 6,285,798 B1 * | 9/2001 | Lee | ............... | 382/260 |
| 6,545,715 B1 * | 4/2003 | Na | ............... | 348/351 |
| 6,813,046 B1 * | 11/2004 | Gindele et al. | ............... | 358/505 |
| 7,146,059 B1 * | 12/2006 | Durand et al. | ............... | 382/260 |
| 7,783,121 B1 * | 8/2010 | Cox | ............... | 382/254 |
| 8,160,380 B2 | 4/2012 | Das Gupta et al. | | |
| 8,184,181 B2 | 5/2012 | Tsuruoka | | |
| 8,260,076 B1 * | 9/2012 | Yang et al. | ............... | 382/261 |
| 8,274,583 B2 | 9/2012 | Zimmer et al. | | |
| 8,285,033 B2 | 10/2012 | Das Gupta et al. | | |
| 8,295,632 B2 | 10/2012 | Fattal | | |
| 2005/0025378 A1 * | 2/2005 | Maurer | ............... | 382/260 |
| 2007/0103570 A1 * | 5/2007 | Inada et al. | ............... | 348/252 |
| 2007/0116373 A1 * | 5/2007 | Hwang et al. | ............... | 382/261 |
| 2007/0165962 A1 * | 7/2007 | Smirnov et al. | ............... | 382/260 |
| 2008/0055338 A1 * | 3/2008 | Wei et al. | ............... | 345/667 |

(Continued)

FOREIGN PATENT DOCUMENTS

| | | |
|---|---|---|
| JP | 2005-293265 A | 10/2005 |
| KR | 100213235 B1 | 8/1999 |
| KR | 20100117457 A | 11/2010 |
| KR | 101001676 B1 | 12/2010 |
| WO | WO 2010100609 A1 * | 9/2010 ............... G06T 5/40 |

OTHER PUBLICATIONS

Paris, Sylvain et al., "A Fast Approximation of the Bilateral Filter using a Signal Processing Approach," International Journal of Computer Vision, vol. 81, 2009, pp. 24-52.*
Durand, Fredo et al., "Fast Bilateral Filtering for the Display of High-Dynamic-Range Images," ACM Transactions on Graphics (SIGGRAPH), vol. 21,2002, pp. 257-266.*
Chen, Jiawen et al., "Real-time Edge-Aware Image Processing with the Bilateral Grid," ACM Transactions on Graphics (SIGGRAPH), vol. 26, No. 103, 2007, 9 pages.*

*Primary Examiner* — Wenpeng Chen
(74) *Attorney, Agent, or Firm* — Harness, Dickey & Pierce, P.L.C.

(57) ABSTRACT

A method of large-radius edge-preserving low-pass filtering is performed on a digital signal having data points. The method includes computing a weighted average of a signal layer at vertices spaced a distance apart such that an amount of the vertices is less than an amount of the data points and producing, for each of the data points, a large-radius edge-preserving low-pass filtered signal based on the weighted average of the signal layer at vertices neighboring the data point.

18 Claims, 10 Drawing Sheets
(2 of 10 Drawing Sheet(s) Filed in Color)

(56) References Cited

U.S. PATENT DOCUMENTS

| | | | |
|---|---|---|---|
| 2009/0278961 A1* | 11/2009 | Mohanty et al. | 348/241 |
| 2009/0285480 A1* | 11/2009 | Bennett et al. | 382/167 |
| 2010/0053384 A1* | 3/2010 | Manabe | 348/254 |
| 2011/0243428 A1* | 10/2011 | Das Gupta et al. | 382/162 |
| 2011/0299769 A1* | 12/2011 | Leitao | 382/164 |
| 2013/0121568 A1* | 5/2013 | Krishnan et al. | 382/162 |
| 2014/0212062 A1* | 7/2014 | Finlayson | 382/263 |

* cited by examiner

LARGE RADIUS EDGE-PRESERVING LOW-PASS FILTERING

BACKGROUND

Dynamic range (DR) is the ratio between the largest and smallest possible values of a changeable quantity. In image processing, the dynamic range DR, often called the "contrast ratio", is the range of luminance. There often is a large difference between the dynamic range DR of an imaging or display device, and the dynamic range DR of a natural scene. Therefore, when a digital image of a natural scene, reproduced using a digital camera, is displayed on a computer display, it may desirable to compress the dynamic range DR of the digital image by a tone mapping technology. Tone mapping or dynamic range compression (DRC) is often used to decrease the dynamic range DR of a scene's luminance captured on the image sensor of the digital camera. The result is more even exposure in the focal plane, with increased detail in the shadows and low-light areas. Though this doesn't increase the fixed dynamic range DR available at the display, it stretches the usable dynamic range DR in practice.

To perform dynamic range compression DRC, an image is often divide imaged into zones of similar luminance and an algorithm attempts to maintain a local contrast level within the zones. In order to divide the image into the zones, it may be desirable to determine the areas of an image having a similar level of luminance. In order to determine the luminance zones, it may be desirable to apply a low-pass filter.

A conventional low-pass filter may perform linear unilateral filtering by averaging adjacent pixel values. However, a unilateral filter may blur edges, which may mix various luminance zones. It may be desirable to apply a low-pass filter that performs a filtering operation inside each of the luminance zones, but at edges therebetween does not apply the filter, thereby preserving the edges between the luminance zones.

A low-pass filter may have a large radius to average the luminance between pixels which are far apart but still belong to the same luminance zone.

Edge preserving filtering is non-linear filtering technique to smooth images while preserving edges. One edge preserving filtering technique is bilateral filtering. Bilateral filtering is an estimator that considers values across edges to be outliers. In bilateral filtering, the intensity value at each pixel in a digital image is replaced by a weighted average of intensity values from nearby pixels, where the weights depend not only on distance between the pixels but also on the differences in intensity between the pixels such that the weight is decreased between pixels with a large difference in intensity.

By replacing the value of the intensity of each pixel with the bilateral weighted average, sharp edges between luminance zones may be preserved by determining that two pixels are similar to each other based on both whether their spatial locations and similarity with respect to pixel luminance. However, a conventional bilateral filter often requires a large set of pixels to contribute to the weighted average, known as a support, to effectively remove noise while preserving important features, inducing slow processing and high equipment costs.

SUMMARY

At least one example embodiment relates to a method of edge-preserving low-pass filtering a digital signal having data points.

In one embodiment, the method includes computing a weighted average of a signal layer at vertices spaced a distance apart such that an amount of the vertices is less than an amount of the data points; and producing, for each of the data points, a large-radius edge-preserving low-pass filtered signal based on the weighted average of the signal layer at vertices neighboring the data point.

In one embodiment, the method includes determining values of an object layer at the vertices, the object layer being a blurred version of the signal layer; and storing the values of the object layer at the vertices in a memory.

In one embodiment, the digital signal is a digital image and the determining values of the object layer, the computing the weighted average of the signal layer and the producing the large-radius edge-preserving low-pass filtered signal each include performing a raster scan a respective layer associated with the digital image.

In one embodiment, the received digital signal is an image signal, the signal layer is a y-channel component of a YUV formatted version of the image signal and the object layer is a blurred version of the signal layer.

In one embodiment, the computing the weighted average of the signal layer at each of the vertices includes, determining, for each vertex, an influence zone surrounding the vertex; and computing, for each vertex, the weighted average of the signal layer of the data points in the signal layer within the influence zone.

In one embodiment, for each vertex, the influence zone includes the data points surrounding the vertex within a two-dimensional space having an area equal to twice a square of the distance the vertices are spaced apart.

In one embodiment, the vertices of the object layer represent volume points in a digital audio signal and the large-radius edge-preserving low-pass filtered signal is a signal emphasizing differences in volume levels in the digital audio signal.

In one embodiment, the weighted average of the signal layer is computed using the equation:

$$S(X, Y) = \frac{\sum_{(x,y) s.t. |x-X|<\Delta \&\& |y-Y|<\Delta} s(x, y) w(x, y, X, Y)}{\sum_{(x,y) s.t. |x-X|<\Delta \&\& |y-Y|<\Delta} w(x, y, X, Y)}$$

where (x,y) are coordinates of the data points, (X,Y) are coordinates of the vertices, S(X,Y) is the weighted average of the signal layer at the coordinate of the vertices, $\Delta$ is the distance the vertices are spaced apart, s(x,y) is the signal layer, and w(x,y,S,Y) is a function that varies directly with a similarity between a value at data point (x,y) and a value at the vertex (X,Y).

In one embodiment, the large-radius edge-preserving low-pass filtered signal is computed using the equation:

$$\bar{s}(x, y) = \frac{\sum_{(X,Y) s.t. |x-X|<\Delta \&\& |y-Y|<\Delta} S(X, Y) w(x, y, X, Y) b(x, y, X, Y)}{\sum_{(X,Y) s.t. |x-X|<\Delta \&\& |y-Y|<\Delta} w(x, y, X, Y) b(x, y, X, Y)}$$

where (x,y) are coordinates of the data points, (X,Y) are coordinates of the vertices, S(X,Y) is the weighted average of the signal layer at the coordinate of the vertices, $\Delta$ is the distance the vertices are spaced apart, s(x,y) is the signal layer, w(x,y,S,Y) is a function that varies directly with a similarity between a value at data point (x,y) and a value of at the vertex (X,Y), and b(x,y,X,Y) is a function that varies directly with a spatial distance between the data points and the vertices.

At least one example embodiment relates to an edge-preserving device configured to perform edge-preserving low-pass filtering on a digital signal having data points.

In one embodiment, the device includes a memory configured to store data; and a processor configured to, compute a weighted average of a signal layer at vertices spaced a distance apart such that an amount of the vertices is less than an amount of the data points, and produce, for each of the data points, a large-radius edge-preserving low-pass filtered signal based on the weighted average of the signal layer at vertices neighboring the data point.

In one embodiment, the processor is further configured to, determine values of an object layer at the vertices; and store the values of the object layer at the vertices in a memory.

In one embodiment, the received digital signal is an image signal, the signal layer is a y-channel component of a YUV formatted version of the image signal and the object layer is a blurred version of the signal layer.

In one embodiment, the processor is configured to compute the weighted average of the signal layer at each of the vertices by, determining, for each vertex, an influence zone surrounding the vertex; and computing, for each vertex, the weighted average of the signal layer of the data points in the signal layer within the influence zone.

In one embodiment, for each vertex, the influence zone includes the data points surrounding the vertex within a two-dimensional space having an area equal to a square of the distance the vertices are spaced apart.

At least one example embodiment relates to a digital signal processor configured to receive a digital signal having data points.

In one embodiment, the digital signal processor includes an edge-preserving processor configured to generate an edge-preserving low-pass filtered image by, computing a weighted average of a signal layer at vertices spaced a distance apart such that an amount of the vertices is less than an amount of the data points, and producing, for each of the data points, a large-radius edge-preserving low-pass filtered signal based on the weighted average of the signal layer at vertices neighboring the data point; and a dynamic range compression (DRC) processor configured to produce a compressed signal by performing dynamic range compression on the digital signal using the large-radius edge-preserving low-pass filtered signal.

In one embodiment, the edge-preserving processor is further configured to, determine values of an object layer at the vertices, the object layer being a blurred version of the signal layer; and store the values of the object layer at the vertices in a memory.

In one embodiment, the edge-preserving processor computes the weighted average of the signal layer at each of the vertices by, determining, for each vertex, an influence zone surrounding the vertex; and computing, for each vertex, the weighted average of the signal layer of the data points in the signal layer within the influence zone.

In one embodiment, for each vertex, the influence zone includes the data points surrounding the vertex within a two-dimensional space having an area equal to a square of twice the distance the vertices are spaced apart.

In one embodiment, the digital signal processor further includes a Bayer-to-yuv processor configured to generate the signal layer such that the signal layer represents a y-channel component of the received digital signal.

In one embodiment, the DRC processor is configured to provide the compressed signal to an output device such that the compressed signal has a dynamic range has been compressed to within the dynamic range available at the output unit.

At least one example embodiment relates to a non-transitory computer readable medium including a computer program including computer program instructions configured to implement the method of edge-preserving low-pass filtering the digital signal when executed by a processor.

BRIEF DESCRIPTION OF THE DRAWINGS

The patent and/or application file contains at least one drawing executed in color. Copies of this patent or patent application publication with color drawing(s) will be provided by the Office upon request and payment of the necessary fee.

Example embodiments will become more fully understood from the detailed description given herein below and the accompanying drawings, wherein like elements are represented by like reference numerals, which are given by way of illustration only and thus are not limiting of the embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional operations not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Figure 1:
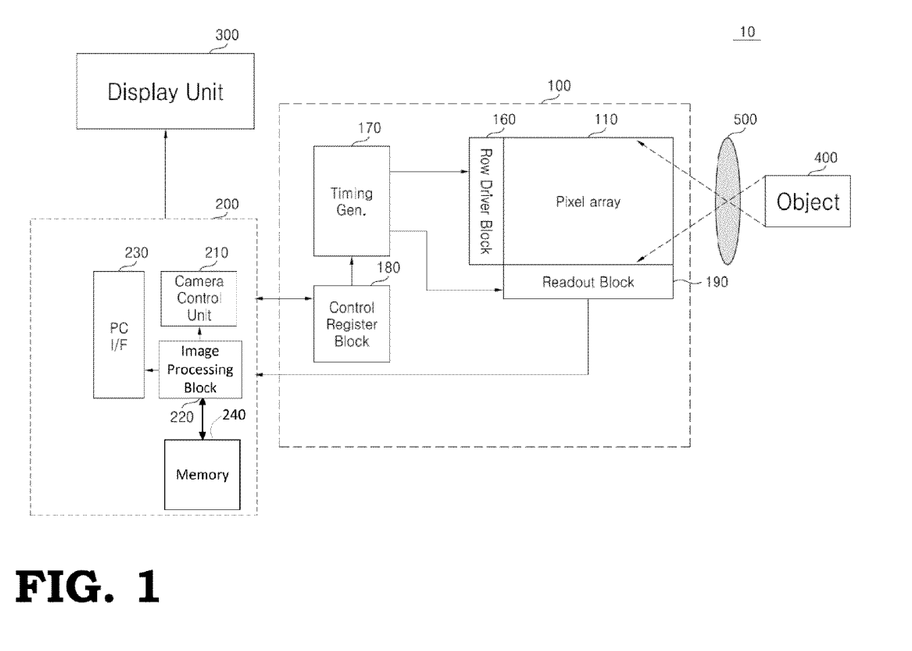
FIG. 1 illustrates a schematic block diagram of an image sensing system including a digital signal processor according to an example embodiment.

FIG. 1 is a schematic block diagram of an image sensing system including an image sensor according to an example embodiment.

Referring to FIG. 1, an image sensing system 10 includes an image sensor 100, a digital signal processor 200, a display unit 300, and/or a lens 500.

The image sensing system 10 may be used in a digital camera or a digital camera-equipped portable device such as mobile user equipment. The image sensing system 10 may sense an image of an object 400 input through the lens 500 according to a control of the digital signal processor 200.

The image sensor 100 may include a pixel array 110, a row driver 120, a timing generator driver 170, a control register block 180 and a readout block 190.

The pixel array 110 may include a plurality of pixels in which a plurality of rows and columns are arranged in a matrix form. The pixel array 110 senses light using a plurality of photoelectric conversion elements (e.g., a photo diode or a pinned photo diode) and converts the light into an electrical signal, thereby generating an image signal.

Each of the plurality of pixels may include a color filter. For example, the color filter may be a red filter passing light in a red wavelength region, a green filter passing light in a green wavelength region, or a blue filter passing light in a blue wavelength region.

According to an example embodiment, the color filter may be a cyan filter, a magenta filter, or a yellow filter. Each of the plurality of pixels may sense light using the photo sensitive element, and generate an image signal, e.g., a pixel signal, by converting the sensed light into an electrical signal.

The digital signal processor 200 may include a camera controller 210, an image processing block 220, an interface (I/F) 230 and a memory 240.

The camera controller 210 may control the image sensor 100 via the control register block 180 using an inter-integrated circuit (I²C); however, example embodiments are not restricted thereto.

The image processing block 220 may generate an image by processing the image signal which is converted by the analog-to-digital converter block 140 and output by the image sensor 100, and output the generated image to a display unit 300 via the interface (I/F) 230 and/or store the generated image in the memory 240. The display unit 300 may include all devices capable of displaying an image.

The timing generator 170 may control the row driver block 160 and the readout block 190 by outputting corresponding control signals thereto.

The control register block 175 may control an operation of image sensor according to a control of the camera controller 210.

The row driver 160 may drive a row of the pixel array 110 by generating a row selection signal based on a row control signal generated by the timing generator 170.

The pixel array 110 may output a pixel signal from the driven row selected by the row selection signal and the gate selection signal, which are provided from the row driver block 160, to the readout block 190, respectively.

The readout block 190 temporarily stores the pixel signal from the pixel array 110 and may include an analog-to-digital converter that converts the pixel signals to a digital image and outputs the converted digital image to the image signal processor 220.

Figure 2:
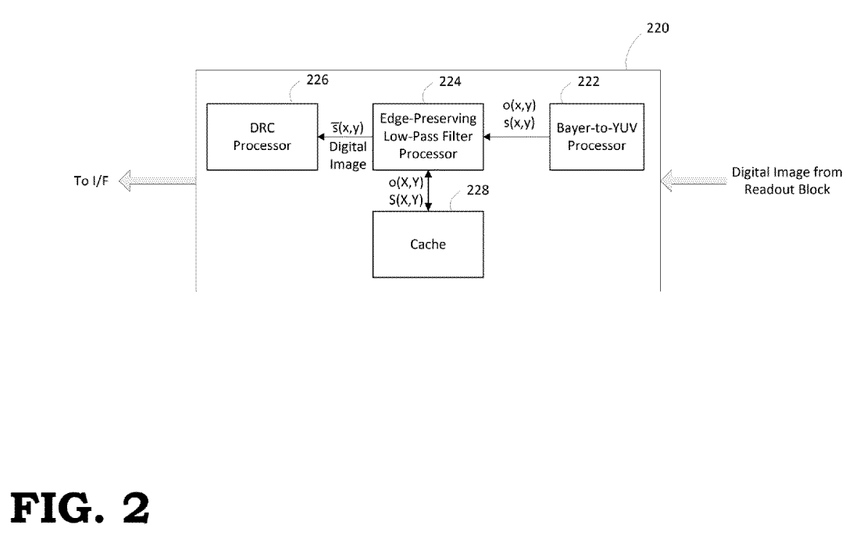
FIG. 2 illustrates a schematic block diagram of an image processing block included in a digital signal processor according to an example embodiment.

FIG. 2 illustrates a schematic block diagram of an image processing block included in a digital signal processor according to an example embodiment.

Referring to FIGS. 1 to 2, the image processing block 220 may include a Bayer-to-YUV processor 222, an edge-preserving low-pass processor 224, a Dynamic Range Compression (DRC) processor 226 and a memory cache 228.

It should be also understood that the image processing block 220 may include features not shown in FIG. 2 and should not be limited to those features that are shown. Further, while the processors 222/224/226 are illustrated as being within the image signal processor 220, the processors 222/224/226 may be embodied outside of the image signal processor 220.

The Bayer-to-YUV processor 222, the edge-preserving low-pass processor 224 and the Dynamic Range Compression (DRC) processor 226 may include any devices capable of processing image data including, for example, a microprocessor configured to carry out specific operations based on input data, or capable of executing instructions included in computer readable code. The computer readable code may be stored on, for example, the memory cache 228.

The memory cache 228 may be any device capable of storing data including magnetic storage, flash storage, etc. The memory cache may be part of the image signal processor 222 or it may be physically situated on an external device.

Figure 3:
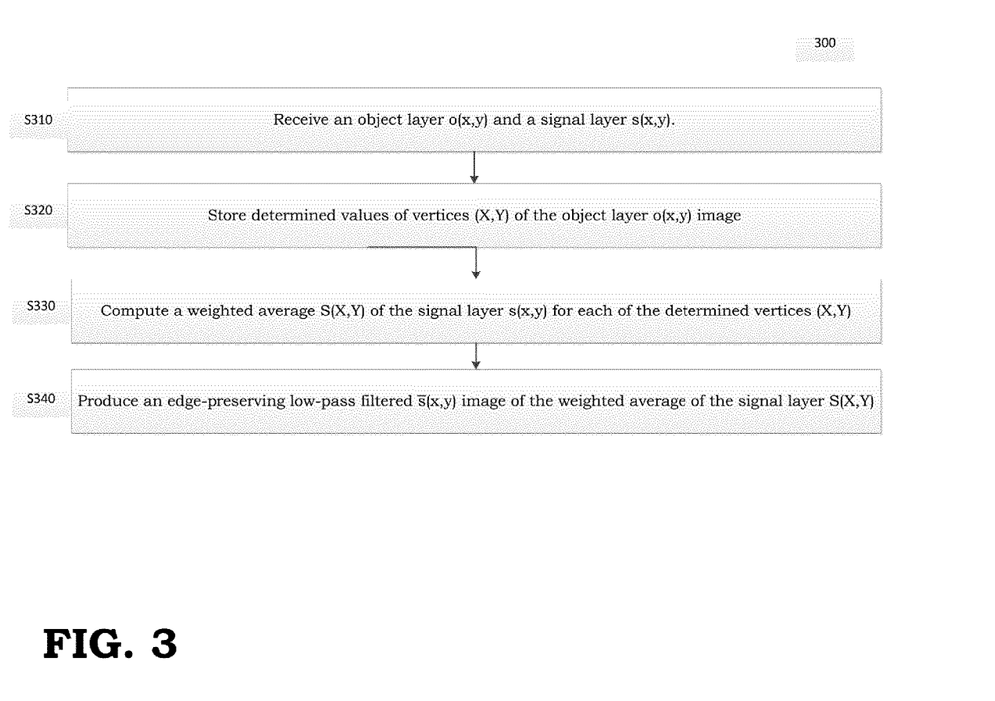
FIG. 3 illustrates a flow chart of a large radius edge preserving method according to an example embodiment.

FIG. 3 illustrates a flow chart of a large radius edge preserving method according to an example embodiment.

Referring to FIGS. 1-3, as illustrated in FIG. 3, in the process 300, the edge-preserving low-pass filter processor 220 may perform three (3) passes in raster scan order over a received digital image to produce a large-radius edge-preserving low-pass filtered digital image.

In operation S310, the edge-preserving low-pass filter processor 224 receives signal layer s(x,y) image and object layer o(x,y) image versions of a digital image.

The signal layer s(x,y) image may represent a luminance level of each of the pixels in the received digital image. The signal layer s(x,y) image may be an image having a high dynamic range (HDR) (e.g. an image having greater than 8-bits of contrast). The object layer o(x,y) may represent a discriminating layer which determines a weight allocated to pixels (x,y) when averaging their respective signal layer values s(x,y). The object layer o(x,y) may be formed by averaging the value of the luminance of each pixel in the object layer o(x,y) image using a convolution matrix having a small support around the pixel (x,y). An example of forming the object layer according to an example embodiment will be discussed in more detail with regard to FIG. 5.

The received digital image may be in a format of a Bayer-pattern, where each pixel has either a red, a blue, or a green intensity level. The generated signal layer s(x,y) and the object layer o(x,y) may be YUV formatted digital images having a luminance component (Y) and two chrominance components (UV). For example, the signal layer s(x,y) may be the luminance component (Y-channel) of the YUV formatted digital image and the object layer o(x,y) may be a blurred version of the luminance component (Y-channel).

Figure 4:
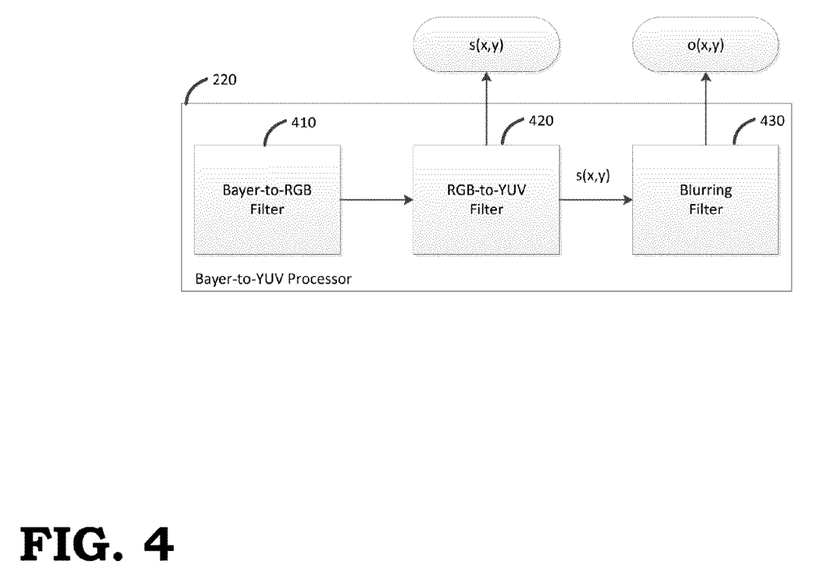
FIG. 4 illustrates a schematic block diagram of a Bayer-to-YUV processor included in the digital signal processor according to an example embodiment.

FIG. 4 illustrates a schematic block diagram of a Bayer-to-YUV processor included in the digital signal processor according to an example embodiment.

Referring to FIGS. 2 and 4, the Bayer-to-YUV processor 222 may generate the signal layer s(x,y) and the object layer o(x,y) based on the digital image received from the readout block 190.

The Bayer-to-YUV processor 222 may include a Bayer-to-RGB filter 410, a RGB-to-YUV filter 420 and a blurring filter 430.

The Bayer-to-RGB filter 410 may receive the digital image having the Bayer pattern format and generate a RGB formatted digital image. The RGB-to-YUV filter 420 may convert the RGB formatted digital image to the YUV formatted digital image and utilize the luminance component (Y-channel) of the YUV formatted digital image as the signal layer s(x,y). The blurring filter 430 may generate the object layer o(x,y) by convolving the YUV formatted digital image with a kernel of Gaussian values. The Gaussian kernel may be a form of a low-pass filter that attenuates high frequency signals.

Figure 5:
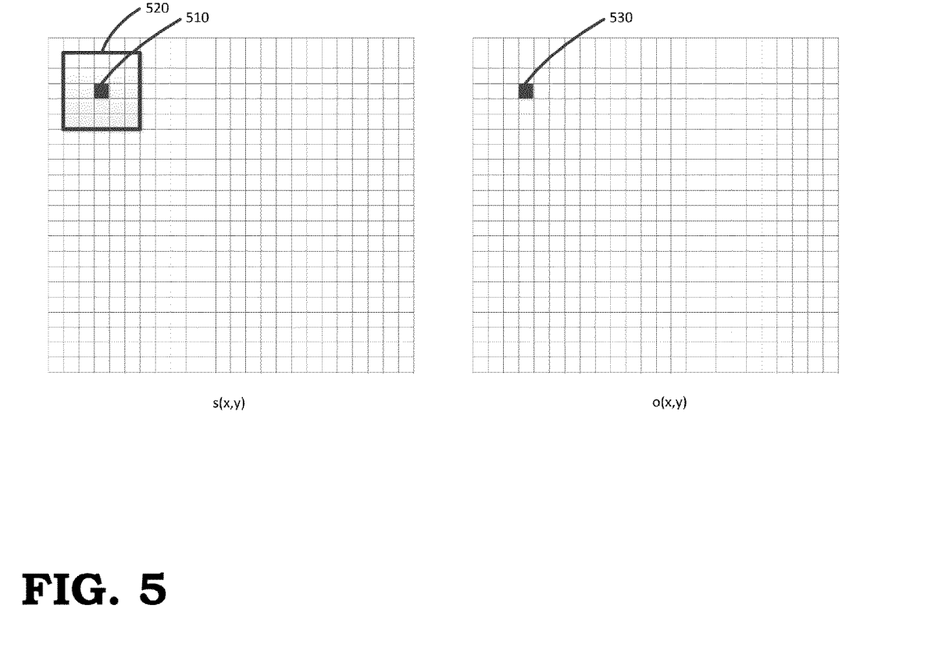
FIG. 5 illustrates a pixel window being blurring by a blurring filter included in a Bayer-to-YUV processor according to an example embodiment.

FIG. 5 illustrates a pixel window being blurring by a blurring filter included in a Bayer-to-YUV processor according to an example embodiment.

As illustrated in FIG. 5, the signal layer s(x,y) input to the blurring filter 430 may have a plurality of pixels 510. The blurring filter 430 may blur each of the pixels 510 by applying a Gaussian kernel in a sliding window 520 and performing a weighted average of the pixels 510 within the sampling window 520 to produce a plurality of blurred pixels 530 in the object layer o(x,y). The sampling window 520 may be a 5×5 pixel window as illustrated in FIG. 5, however, example embodiments are not limited thereto and the blurring filter 430 may utilize various sliding windows as sample data to produce the blurred pixels 530 in the object layer o(x,y).

While example embodiments illustrate the Bayer-to-YUV processor 222 generating the signal layer s(x,y) and the object layer o(x,y), the signal layer s(x,y) image and object layer o(x,y) image are inputs to the edge-preserving low-pass filter processor 224 and, therefore, may be pre-processed and provided to the edge-preserving low-pass filter processor 224 via an external input, for example, from the memory 240.

Referring back to FIGS. 2 and 3, in operation S320, the edge-preserving low-pass filter processor 224 may determine values at vertices (X,Y) located in the object layer o(x,y) image by performing a raster scan of the object layer o(x,y) image and store the determined object layer vertices o(X,Y) in the memory 240 and/or the cache 228.

The edge-preserving low-pass filter processor 224 may determine the vertices (X,Y) by dividing the digital image into a grid having vertices (X,Y) spaced delta Δ pixels apart, where Δ is an effective radius of the edge-preserving low-pass filter. For example, the vertices (X,Y) may be spaced between twenty five and seventy five pixels apart from each other in two dimensions of the object layer o(x,y) image. Further, the vertices (X,Y) may be spaced differently depending on the resolution of the digital image. For example, as the resolution of the digital image increases, the distance Δ between vertices (X,Y) may increase. The effective radius Δ may be larger than an effective radius of a conventional image signal processor, which may be limited to between 10 and 20 pixels.

Figure 7A:
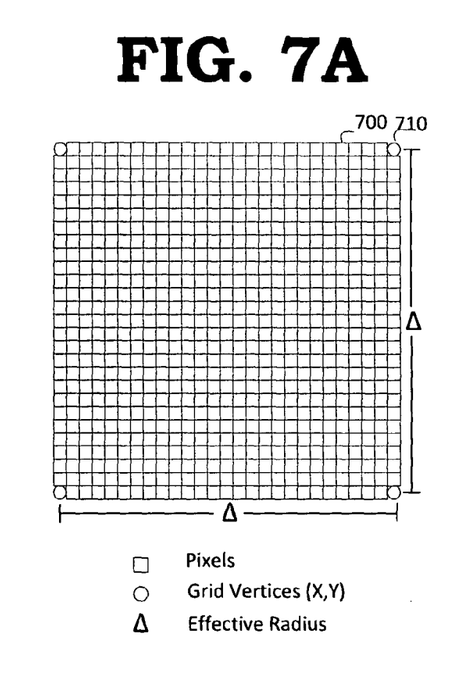
FIGS. 7A-C are diagrams of pixel arrays used by a large radius edge preserving low pass filtering method according to an example embodiment.

For example, as illustrated in FIG. 7A, the edge-preserving low-pass filter processor 224 may determine pixels 700 every Δ pixels apart to be a vertex (x,y) 710. Therefore, the amount of space required to store the vertices (X,Y) of the object layer o(x,y) in the memory 240 and/or the cache 228 may be sparse in comparison to the amount of data in the object layer o(x,y).

Figure 6:
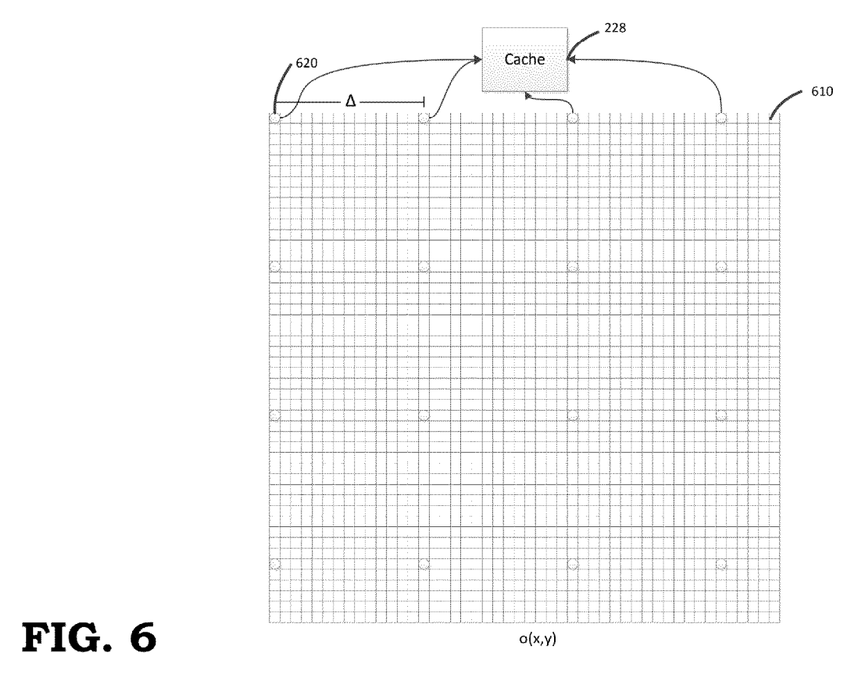
FIG. 6 illustrates an example of an edge-preserving low-pass filter processor determining values at vertices (X,Y) in an object layer o(x,y) image by performing a raster scan of the object layer o(x,y) image according to an example embodiment.

FIG. 6 illustrates an example of an edge-preserving low-pass filter processor determining values at vertices (X,Y) in an object layer o(x,y) image by performing a raster scan of the object layer o(x,y) image according to an example embodiment.

As illustrated in FIG. 6, the object layer o(x,y) includes a plurality of pixels 610 including vertex pixels o(X,Y) spaced Δ=14 pixels apart in a two-dimensional plane. As the edge-preserving low-pass filter processor 224 performs a raster image scan over the pixels 610, the edge-preserving low-pass filter processor 224 stores pixel values of the object layer o(x,y) at the vertices o(X,Y) in memory, for example, in the cache 228. While FIG. 6 illustrates vertex pixels o(X,Y) spaced Δ=14 pixels, example embodiments are not limited thereto. For example, as discussed above, the vertices o(X,Y) may be spaced between twenty five and seventy five pixels apart from each other in two dimensions of the object layer o(x,y) image.

Referring back to FIGS. 2 and 3, in operation S330, the edge-preserving low-pass filter processor 224 may compute a weighted average of the signal layer s(x,y) image for each of the determined vertices (X,Y) using equations 1 and 2 below. The edge-preserving low-pass filter processor 224 may determine the weighted average of the signal layer S(X,Y) by performing, during a raster scan of the signal layer s(x,y) image, for each vertex of interest (X,Y), a weighted average of all of the pixels (x,y) in the signal layer s(x,y) image within an influence zone defined by $(2\Delta)^2$ pixels that surround the vertex of interest (X,Y). Therefore, the influence zone for a particular vertex of interest (X,Y) may be a range of pixels (x,y) in the signal layer s(x,y) image where $|x-X|<\Delta$ and $|y-Y|<\Delta$. In other words, the influence zone may be defined as including the pixels (x,y) within a $2\Delta \times 2\Delta$ square surrounding the vertex of interest (X,Y).

$$S(X, Y) = \frac{\sum_{(x,y) s.t. |x-X|<\Delta \&\& |y-Y|<\Delta} s(x, y) w(x, y, X, Y)}{\sum_{(x,y) s.t. |x-X|<\Delta \&\& |y-Y|<\Delta} w(x, y, X, Y)} \quad \text{Eq. (1)}$$

$$\text{where } w(x, y, X, Y) = e^{\frac{-(o(x,y)-o(X,Y))^2}{\sigma^2}} \quad \text{Eq. (2)}$$

As can be seen from equations 1 and 2, for each pixel (x,y), a weight function w(x,y,X,Y) depends on the value of the object layer value for the respective pixel o(x,y) as a discriminator in the determination of the weight allocated to the pixel (x,y), the value of the object layer image at the grid vertex o(X,Y) stored in the memory 228/240 in operation S320, as well as a selectivity parameter σ. Therefore, to determine the weighted average of the signal layer S(X,Y) for the vertices (X,Y), in addition to performing the raster scan of the signal layer s(x,y) image, the edge-preserving low-pass filter processor 224 may raster scan the object layer o(x,y) image to determine the weight function w(x,y,X,Y). For example, the edge-preserving low-pass filter processor 224 may simultaneously raster scan the signal layer s(x,y) and the object layer o(x,y).

In the weight function w(x,y,X,Y) of Eq. (2), as the value of σ increases, the less a difference (e.g., luminance) between the object layer value of the pixel o(x,y) and the object layer value of the vertex o(X,Y) will influence the weighted average of the signal layer S(X,Y). Therefore as the value of σ increases toward infinity, the filter will be less selective and thus less edge preserving. In contrast, as σ approaches zero, the filter will be very selective and only pixels having an object layer value o(x,y) equal to an object layer value of the grid vertex o(X,Y) may influence the weighted average of signal layer S(X,Y) for the grid vertex (X,Y).

While Eq. 2 illustrates a Gaussian kernel used as the weight function, one of ordinary skill in the art will appreciate that any weight function can be used to discriminate in the determination of the weight allocated to a pixel (x,y). For example, the weight function can be a function that produces a weight equal to "1" when the absolute value (abs) of the difference between the object layer for a pixel o(x,y) and the object layer for the vertex o(X,Y): abs(o(x,y)−o(X,Y)) is below a threshold and the weight may be equal to "0" otherwise.

In operation S340 the edge-preserving low-pass filter processor 224 may produce an edge-preserving low-pass filtered version s̄(x,y) of the weighted average of the signal layer S(X,Y) by averaging values of neighboring vertices (X,Y) in the weighted average of the signal layer S(X,Y) using equations 3 and 4, below. The edge-preserving low-pass filter processor 224 may produce edge preserving low-pass filtered version s̄(x,y) by calculating, during a raster scan of the object layer o(x,y), for each of the pixels (x,y), the weighted average of the signal layer S(X,Y) at the four (4) vertices (X,Y) which surround the pixel (x,y) multiplied by the weight function w(x,y,X,Y) and a spatial function b for the respective four (4) vertices (X,Y) which surround the pixel (x,y).

$$\bar{s}(x, y) = \frac{\Sigma_{\{(X,Y) s.t. |x-X|<\Delta \&\& |y-Y|<\Delta\}} S(X, Y) w(x, y, X, Y) b(x, y, X, Y)}{\Sigma_{\{(X,Y) s.t. |x-X|<\Delta \&\& |y-Y|<\Delta\}} w(x, y, X, Y) b(x, y, X, Y)} \quad \text{Eq. (3)}$$

$$\text{where } b(x, y, X, Y) = (\Delta - |X - x|)(\Delta - |Y - y|) \quad \text{Eq. (4)}$$

As shown in Eq. (2) above, for each pixel (x,y), the weight function w(x,y,X,Y) may depend on the value of the object layer for the respective pixel o(x,y), the value of the object layer at the grid vertex o(X,Y) stored in the memory 228/240 in operation S320, as well as a selectivity parameter σ.

Further, as shown in Eq. (4), the spatial function b is a function of the effective radius Δ of the low-pass filter such that if the weight w(x,y,X,Y) were equal to 1, then the edge-preserved low-pass filtered $\bar{s}(x,y)$ layer would be the result of bilinear interpolation. The selectively parameter σ used to calculate the weight function w(x,y,X,Y) in equation 3 may be the same as the selectivity parameter used in equations 1 and 2.

Figure 7B:
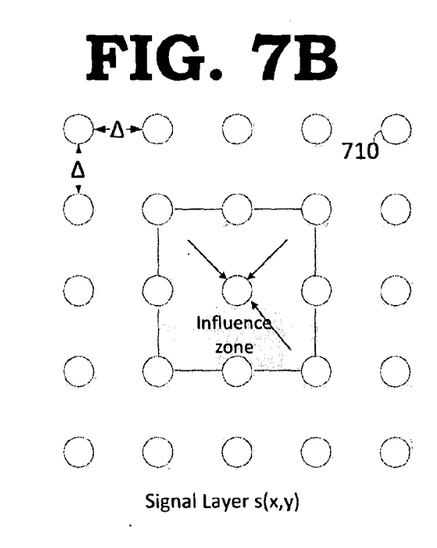
Figure 7C:
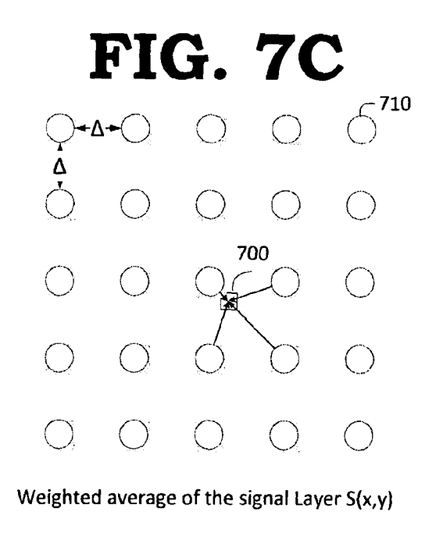

FIGS. 7A-C are diagrams of pixel arrays used by a large-radius edge preserving method according to an example embodiment.

FIG. 7A illustrates a pixel window which may represent the received digital image, the generated signal layer s(x,y) image and the object layer o(x,y) image. As illustrated in FIG. 7A, the received digital image, the generated signal layer s(x,y) and the object layer o(x,y) image may all be defined by a plurality of pixels 700. The signal layer s(x,y) image may have stored therein a luminance value of each of the plurality of pixels 700 of the received digital image, while the object layer o(x,y) may be a blurred version of the signal layer s(x,y), having stored therein an average value of the luminance of the pixels in the object layer o(x,y) for the small support window around each of the pixels (x,y). For example, the support may be the 3×3 pixels or the 5×5 pixels neighboring each pixel (x,y).

FIG. 7B illustrates producing the weighted average of the signal layer S(x,y) at each of the vertices (X,Y). As illustrated in FIG. 4B, the weighted average of the signal layer S(x,y) for a vertex of interest (X,Y) at the center of the figure is determined by computing the weighted average of the signal layer s(x,y) for each of the pixels within the illustrated influence zone defined by the (2Δ)² pixels that surround the vertex (X,Y) of interest.

FIG. 7C illustrates producing the edge preserving low-pass filtered version $\bar{s}(x,y)$ from the weighted average of the signal layer S(x,y). As illustrated in FIG. 7C, for a pixel (x,y) 700, the edge-preserving low-pass filter processor 224 may produce the edge preserving low-pass filtered version $\bar{s}(x,y)$ by performing a bi-directional average of the values of the weighted average of the signal layer S(X,Y) at the four (4) vertices (X,Y) 710 which surround the pixel (x,y) 400 using the weight function w(x,y,X,Y) and the spatial function b(x,y,X,Y) for the respective four (4) vertices (X,Y) which surround the pixel (x,y).

While the edge preserving low-pass filtered version $\bar{s}(x,y)$ of the image is illustrated in FIG. 7C as being computed using four (4) neighboring vertices (X,Y), one of ordinary skill in the art will appreciate that the edge preserving low-pass filtered version $\bar{s}(x,y)$ of the image may be computed using sixteen (16) neighboring vertices (X,Y) and in such a case the spatial function b may be a function that is bicubic. Further, the spatial function b may be any spatial function that discriminates based on the spatial distance between a pixel (x,y) and a vertex (X,Y), such as a Gaussian kernel.

Referring back to FIG. 2, the Dynamic Range Compression (DRC) processor 226 may perform dynamic range compression (DRC) on the digital image received from the read-out block 190 using the edge preserving low-pass filtered version $\bar{s}(x,y)$ of the digital image to produce an image whose contrast has been enhanced by treating different luminance zones, as defined in the edge-preserving low-pass filtered $\bar{s}(x,y)$ image, differently. For example, the Dynamic Range Compression (DRC) processor 226 may lighten low luminance zones where the edge-preserving low-pass filtered $\bar{s}(x,y)$ image is lower than a threshold and darken high luminance zones where the edge-preserving low-pass filtered $\bar{s}(x,y)$ image is greater than the threshold.

Figure 8:
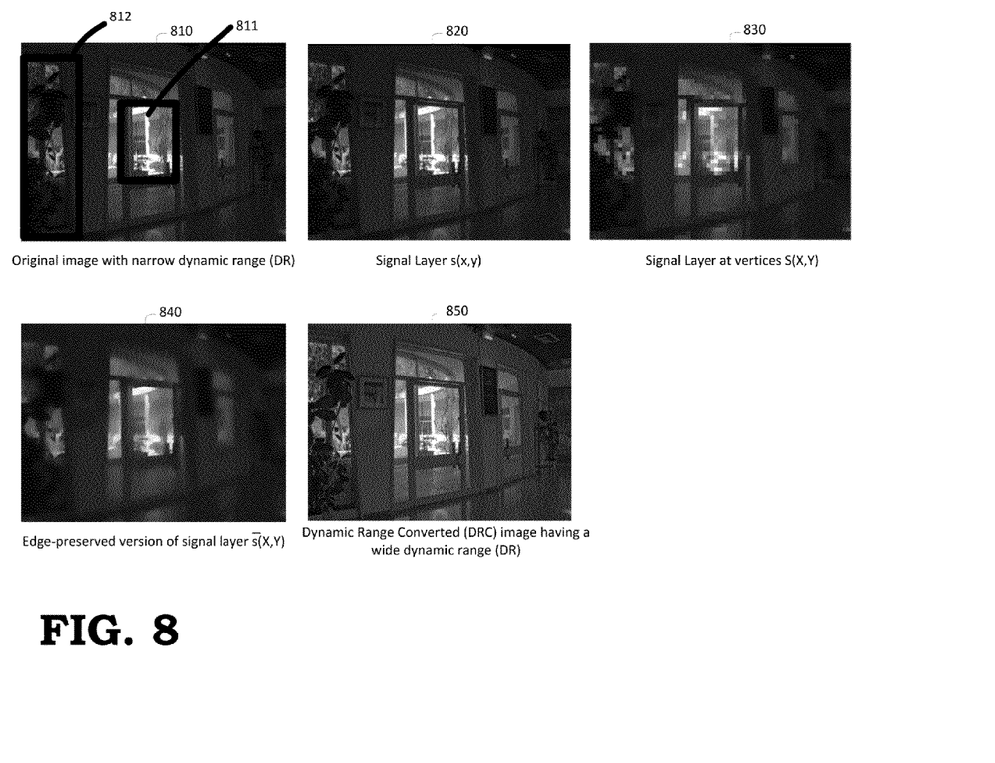
FIG. 8 illustrates a digital image undergoing edge preserving low-pass filtering, according to an example embodiment.

FIG. 8 illustrates a digital image undergoing edge preserving low-pass filtering, according to an example embodiment.

Referring to FIG. 8, a received digital image 810 may have an amount of bits of dynamic range (e.g., the eight (8) most significant bits (MSBs) of the received digital image 810) used for displaying the image on a display. The received digital image 810 may processed by the edge-preserving low-pass filter processor 224 to produce an edge preserving low-pass filtered version $\bar{s}(x,y)$ 840 of the received digital image 810 having gray levels which distinctly separate the different luminance zones. For example, as illustrated in FIG. 8A, a luminance zone 815 has a much higher luminance than the rest of the digital image 810. The edge-preserving low-pass filter processor 224 may receive a signal layer s(x,y) image 820 representing a luminance component (Y-channel) of the received digital image 810. Based on the received signal layer s(x,y), the edge-preserving low-pass filter processor 224 may produce a weighted average of the signal layer S(X,Y) 830 at vertices (X,Y) and an edge-preserving low-pass filtered version $\bar{s}(x,y)$ 840 of the weighted average of the signal layer S(X,Y)

Using the large-radius edge-preserving low-pass filtered version $\bar{s}(x,y)$ 840, the Dynamic Range Compression (DRC) processor 226 may accentuate details in the image by treating the different luminance zones differently. For example, the Dynamic Range Compression (DRC) processor 226 may produce a low Dynamic Range image 850 by lighten low luminance zones 812 where the edge-preserving low-pass filtered $\bar{s}(x,y)$ image is lower than a threshold and darken high luminance zones 811 where the edge-preserving low-pass filtered $\bar{s}(x,y)$ image is greater than the threshold. The low Dynamic Range image 850 may have a same amount of bits of dynamic range as the received digital image 810 (e.g. eight (8) bits of dynamic range), however, the details in the low luminance zones (e.g. zone 812) and the high luminance zones (e.g. zone 811) may each be more visible due to the different treatment provided to each of the luminance zones.

Figure 9:
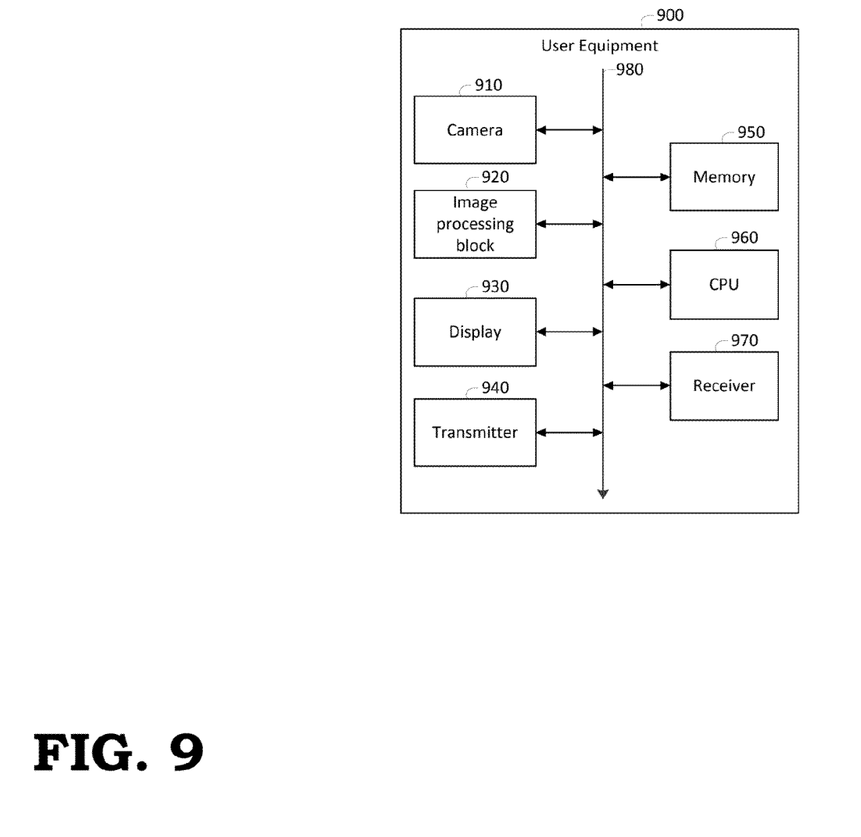
FIG. 9 illustrates user equipment according to an example embodiment.

FIG. 9 illustrates user equipment according to an example embodiment.

Referring to FIG. 9, a user equipment 900 may include a camera 910, an image processing block 920, a display 930, a transmitter 940, a memory 950, a Central Processing Unit (CPU) 960, a receiver 970 and a data bus 980 that handles communication therebetween.

The camera 910 may sense an image of an object input through a lens and convert the sensed image into a digital image. The image processing block 920 may include an edge-preserving filtering processor that is configured to perform a large radius edge-preserving low pass filtering and dynamic range compression on the digital image. The display unit 930 may display the processed image to a user under the control of the CPU 960. The camera 910, the image processing block 920, the display unit 930 and the memory 950 may represent the image sensing system 10 of FIG. 1.

The transmitter 940 and receiver 970 may transmit and receive signals, respectively under the control of the CPU 660. The transmitter 940 and receiver 970 may include hardware and any necessary software for transmitting and receiving wireless signals, respectively, including, for example, data signals, control signals, and signal strength/quality information via one or more wireless connections to other network elements.

While example embodiments have been particularly shown and described, it will be understood by one of ordinary skill in the art that variations in form and detail may be made therein without departing from the spirit and scope of the claims. In particular, while example embodiments have described the signal layer s(x,y) as representing the luminance of the received digital image, the signal layer s(x,y) may be any layer which represents variations in the luminance of the received digital image. For example, the signal layer s(x,y) may be a logarithm of the luminance of the received digital image and the o(x,y) may represent a blurred version of the logarithm of the luminance. Further, while example embodiments have described that the edge-preserving low-pass filtered s̄(x,y) image is used to adjust differences in luminance levels between zones, the signal layer s(x,y) may be the variance in a 5×5 window around the pixel (x,y) and the edge-preserving low-pass filtered s̄(x,y) image may be used as an indication of differences in texture between the zones of the image. Therefore, a noise reducing processor may perform stronger noise reduction in areas without texture.

Additionally, while example embodiments have been described with reference to producing a large-radius edge-preserving low-pass filtered version of a digital image signal, example embodiments are not limited hereto.

Figure 10:
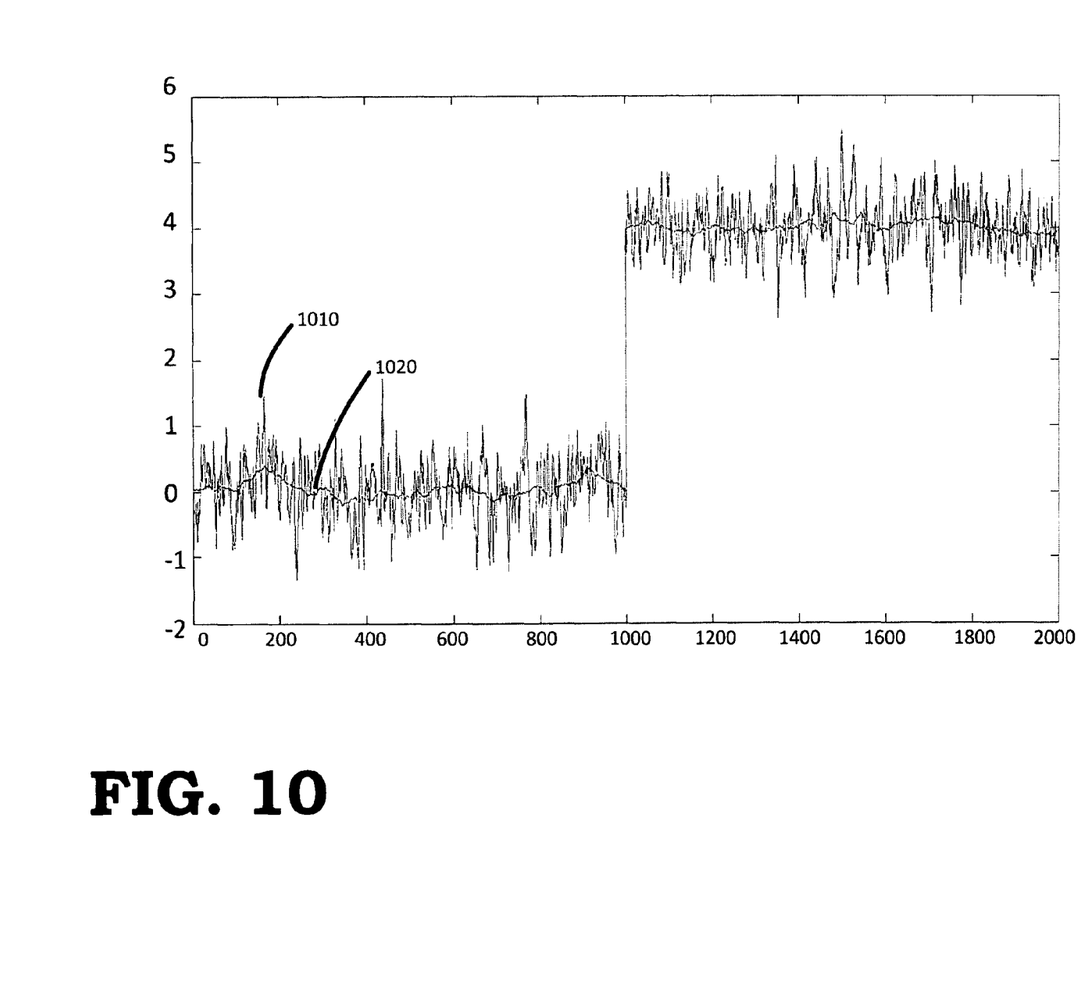
FIG. 10 illustrates a plot of a sound signal and a corresponding large-radius edge-preserving low-pass-filtered version of the sound signal according to an example embodiment.

FIG. 10 illustrates a plot of a sound signal and a corresponding large-radius edge-preserving low-pass-filtered version of the sound signal according to an example embodiment.

Referring to FIGS. 2 and 10, the edge-preserving low-pass filter processor 224 may receive a digital audio signal 1010 and produce an edge-preserving low-pass filtered version of the digital audio signal 1020 which preserves sharp edges volume. The DRC processor 226 may utilize the edge-preserving low-pass filtered version of the digital audio signal to perform audio processing. For example, the DRC processor 226 may utilize an edged-preserving low-pass filtered version of the volume to produce an audio signal whose dynamic range has been compressed to remove sharp changes in the volume of the digital audio signal such as often produced during commercial breaks in an television or radio signal.

By storing only the values of the pixels at grid vertices (X,Y) in the object layer o(x,y) and not the value of all of the pixels (x,y) in the object layer o(x,y), the memory requirements may be significantly reduced. Further, the amount of processing may be significantly reduced by computing the weighted average of the signal layer S(X,Y) only at the vertices (X,Y) and by computing the edge-preserved low-pass filtered value of each pixel s̄(x,y) by averaging only the values of the vertices which surround the pixel (x,y) (e.g., the four (4) neighboring vertices).

I claim:

1. A method of edge-preserving low-pass filtering a digital signal having data points, the method comprising:
computing a weighted average of a signal layer at vertices spaced a distance apart within an influence zone consisting of a range of the data points surrounding a respective one of the vertices such that an amount of the vertices is less than an amount of the data points and a weight given to a respective one of the vertices in the weighted average of the signal layer is based on a difference between values of the data points within the influence zone and a value at the respective one of the vertices in an object layer representing a blurred version of the signal layer, the value of the vertices of the object layer being read from a memory and the values of each of the data points within the influence zone being determined via a raster scan performed during the computing; and
producing, for each of the data points, a large-radius edge-preserving low-pass filtered signal based on the weighted average of the signal layer at the vertices neighboring a respective one of the data points.

2. The method of claim 1, further comprising:
determining values of the object layer at the vertices, the object layer being the blurred version of the signal layer; and
storing the values of the object layer at the vertices in the memory.

3. The method of claim 2, wherein
the digital signal is a digital image and,
the determining values of the object layer, the computing the weighted average of the signal layer and the producing the large-radius edge-preserving low-pass filtered signal each include performing a raster scan of a respective layer associated with the digital image.

4. The method of claim 2, wherein the digital signal is an image signal, the signal layer is a y-channel component of a YUV formatted version of the image signal and the object layer is the blurred version of the signal layer.

5. The method of claim 2, wherein the vertices of the object layer represent volume points in a digital audio signal and the large-radius edge-preserving low-pass filtered signal is a signal emphasizing differences in volume levels in the digital audio signal.

6. The method of claim 1, wherein, for each vertex, the influence zone includes the data points surrounding the vertex within a two-dimensional space having an area equal to a square of twice the distance the vertices are spaced apart.

7. The method of claim 1, wherein the weighted average of the signal layer is computed using the equation:

$$S(X, Y) = \frac{\sum_{\{(x,y) s.t. |x-X|<\Delta \&\& |y-Y|<\Delta\}} s(x, y) w(x, y, X, Y)}{\sum_{\{(x,y) s.t. |x-X|<\Delta \&\& |y-Y|<\Delta\}} w(x, y, X, Y)}$$

where (x,y) are coordinates of the data points, (X,Y) are coordinates of the vertices, S(X,Y) is the weighted average of the signal layer at the coordinate of the vertices, Δ is the distance the vertices are spaced apart, s(x,y) is the signal layer, and w(x,y,X,Y) is a function that varies directly with a similarity between a value at data point (x,y) and a value at the vertex (X,Y).

8. The method of claim 1, wherein the large-radius edge-preserving low-pass filtered signal is computed using the equation:

$$\bar{s}(x, y) = \frac{\sum_{\{(X,Y) s.t. |x-X|<\Delta \&\& |y-Y|<\Delta\}} S(X, Y) w(x, y, X, Y) b(x, y, X, Y)}{\sum_{\{(X,Y) s.t. |x-X|<\Delta \&\& |y-Y|<\Delta\}} w(x, y, X, Y) b(x, y, X, Y)}$$

where (x,y) are coordinates of the data points, (X,Y) are coordinates of the vertices, S(X,Y) is the weighted average of the signal layer at the coordinate of the vertices, Δ is the distance the vertices are spaced apart, s(x,y) is the signal layer, w(x,y,X,Y) is a function that varies directly with a similarity between a value at data point (x,y) and a value of at the vertex (X,Y), and b(x,y,X,Y) is a function that varies directly with a spatial distance between the data points and the vertices.

9. An edge-preserving device configured to perform edge-preserving low-pas filtering on a digital signal having data points, the device comprising:

a memory configured to store data; and a processor configured to, compute a weighted average of a signal layer at vertices spaced a distance apart within an influence zone consisting of a range of the data points surrounding a respective one of the vertices such that an amount of the vertices is less than an amount of the data points a weight given to a respective one of the vertices in the weighted average of the signal layer is based on a difference between values of the data points within the influence zone and a value at the respective one of the vertices in an object layer representing a blurred version of the signal layer, the value of the vertices of the object layer being read from the memory and the values of each of the data points within the influence zone being determined via a raster scan performed when the processor computes the weighted average of the signal layer, and produce, for each of the data points, a large-radius edge-preserving low-pass filtered signal based on the weighted average of the signal layer at the vertices neighboring a respective one of the data points.

10. The device of claim 9, wherein the processor is further configured to, determine values of the object layer at the vertices; and store the values of the object layer at the vertices in the memory.

11. The device of claim 10, wherein the digital signal is an image signal, the signal layer is a y-channel component of a YUV formatted version of the image signal and the object layer is a blurred version of the signal layer.

12. The device of claim 9, wherein, for each vertex, the influence zone includes the data points surrounding the vertex within a two-dimensional space having an area equal to a square of twice the distance the vertices are spaced apart.

13. A digital signal processor configured to receive a digital signal having data points, the digital signal processor comprising:

an edge-preserving processor configured to generate an edge-preserving low-pass filtered image by, computing a weighted average of a signal layer at vertices spaced a distance apart within an influence zone consisting of a range of the data points surrounding a respective one of the vertices such that an amount of the vertices is less than an amount of the data points and a weight given to a respective one of the vertices in the weighted average of the signal layer is based on a difference between values of the data points within the influence zone and a value at the respective one of the vertices in an object layer representing a blurred version of the signal layer, the value of the vertices of the object layer being read from a memory and the values of each of the data points within the influence zone being determined via a raster scan performed when the processor computes the weighted average of the signal layer, and producing, for each of the data points, a large-radius edge-preserving low-pass filtered signal based on the weighted average of the signal layer at the vertices neighboring a respective one of the data points; and a dynamic range compression (DRC) processor configured to produce a compressed signal by performing dynamic range compression on the digital signal using the large-radius edge-preserving low-pass filtered signal.

14. The digital signal process of claim 13, wherein the edge-preserving processor is further configured to, determine values of the object layer at the vertices, the object layer being the blurred version of the signal layer; and store the values of the object layer at the vertices in the memory.

15. The digital signal processor of claim 13, wherein, for each vertex, the influence zone includes the data points surrounding the vertex within a two-dimensional space having an area equal to a square of twice the distance the vertices are spaced apart.

16. The digital signal processor of claim 13, further comprising:

a bayer-to-yuv processor configured to generate the signal layer such that the signal layer represents a y-channel component of the received digital signal.

17. The digital signal processor of claim 13, wherein the DRC processor is configured to provide the compressed signal to an output device such that the compressed signal has a dynamic range has been compressed to within the dynamic range available at the output unit.

18. A non-transitory computer readable medium including a computer program comprising:

computer program instructions configured to implement the method of claim 1 when executed by a processor.

* * * * *